(12) United States Patent
Gao

(10) Patent No.: US 11,455,729 B2
(45) Date of Patent: Sep. 27, 2022

(54) IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Yang Gao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 116 days.

(21) Appl. No.: 16/995,343

(22) Filed: Aug. 17, 2020

(65) Prior Publication Data
US 2020/0380682 A1    Dec. 3, 2020

Related U.S. Application Data

(63) Continuation of application No. PCT/CN2019/091682, filed on Jun. 18, 2019.

(30) Foreign Application Priority Data

Jul. 23, 2018    (CN) .......................... 201810814349.7

(51) Int. Cl.
G06T 7/73    (2017.01)
G06T 5/50    (2006.01)
G06V 40/16    (2022.01)
G06T 7/00    (2017.01)
G06T 7/10    (2017.01)

(52) U.S. Cl.
CPC ............. G06T 7/0014 (2013.01); G06T 5/50 (2013.01); G06T 7/10 (2017.01); G06T 7/74 (2017.01);
(Continued)

(58) Field of Classification Search
CPC .......... G06T 7/0014; G06T 7/74; G06T 7/10; G06T 5/50; G06T 2207/20132;
(Continued)

(56) References Cited

U.S. PATENT DOCUMENTS

2004/0056857 A1*   3/2004   Zhang .................... G06T 13/40
                                                     345/419
2018/0173394 A1    6/2018   Chen et al.
(Continued)

FOREIGN PATENT DOCUMENTS

CN    105991916 A       10/2016
CN    106341696 A  *    1/2017
(Continued)

OTHER PUBLICATIONS

The World Intellectual Property Organization (WIPO) International Search Report for PCT/CN2019/091682 dated Sep. 18, 2019 6 Pages (including translation).
(Continued)

*Primary Examiner* — Bernard Krasnic
(74) *Attorney, Agent, or Firm* — Anova Law Group, PLLC

(57) ABSTRACT

An image processing method includes: obtaining a first target face image in a reference expression state; obtaining user face key point offset information that includes offsets between face key points of a user in a target expression state and face key points of the user in the reference expression state; adjusting face key points of the first target face image in the reference expression state according to the user face key point offset information; and attaching, in a to-be-processed image including a second target face image, an expression texture image of the adjusted first target face image to the second target face image, the second target face image and the first target face image belonging to a same target.

18 Claims, 7 Drawing Sheets

(52) U.S. Cl.
CPC .. *G06V 40/172* (2022.01); *G06T 2207/20132* (2013.01); *G06T 2207/20221* (2013.01); *G06T 2207/30201* (2013.01)

(58) Field of Classification Search
CPC ........... G06T 2207/20221; G06T 2207/30201; G06V 40/172
See application file for complete search history.

(56) References Cited

U.S. PATENT DOCUMENTS

2018/0189553 A1\* 7/2018 Guo ................... G06V 10/757
2018/0204052 A1   7/2018 Li et al.

FOREIGN PATENT DOCUMENTS

| | | | |
|---|---|---|---|
| CN | 106341696 A | 1/2017 | |
| CN | 107316020 A | 11/2017 | |
| CN | 107507216 A | 12/2017 | |
| CN | 108985241 A | 12/2018 | |
| CN | 107146199 B \* | 1/2020 | ......... G06K 9/00234 |
| WO | WO-2015074476 A1 \* | 5/2015 | ......... G06K 9/00221 |
| WO | 2017035966 A1 | 3/2017 | |

OTHER PUBLICATIONS

The European Patent Office (EPO) The Extended European Search Report for 19841233.0 dated Jun. 22, 2021 7 Pages.

\* cited by examiner

IMAGE PROCESSING METHOD AND APPARATUS, AND STORAGE MEDIUM

CROSS-REFERENCES TO RELATED APPLICATIONS

This application is a continuation application of PCT Patent Application No. PCT/CN2019/091682, filed on Jun. 18, 2019, claims priority to Chinese Patent Application No. 201810814349.7, entitled "IMAGE PROCESSING METHOD AND APPARATUS, COMPUTER DEVICE, AND STORAGE MEDIUM" and filed with the National Intellectual Property Administration, PRC on Jul. 23, 2018, the entire contents of both of which are incorporated herein by reference.

FIELD OF THE TECHNOLOGY

The present disclosure relates to the field of computer technologies, and in particular, to an image processing method and apparatus, a computer device, and a storage medium.

BACKGROUND OF THE DISCLOSURE

With the rapid development of science and technology, the field of image processing technologies also grows and develops continuously. In people's life and work, image processing requirement, for example, face swapping (that is, changing facial information in an image), is usually involved.

In a conventional method for changing facial information in an image, a face A in an image is directly replaced by a face B in another image. In this case, when the face A and the face B are not the face of the same person, the face in the image after the replacement loses original facial features. However, a user sometimes wants to change the facial information of the image on the premise of reserving the original facial features of the image. For example, the user is not satisfied with the facial expression in the image, and hopes to change the facial expression in the image without changing the original facial features. However, the conventional method cannot change an expression while reserving original facial features of an image.

SUMMARY

Embodiments of the present disclosure provide an image processing method and apparatus, a computer device, and a storage medium, so that an expression in an image can be changed on the premise that original facial features of the image are reserved.

An image processing method is provided, performed by a computer device, the method including: obtaining a first target face image in a reference expression state; obtaining user face key point offset information that includes offsets between face key points of a user in a target expression state and face key points of the user in the reference expression state; adjusting face key points of the first target face image in the reference expression state according to the user face key point offset information; and attaching, in a to-be-processed image including a second target face image, an expression texture image of the adjusted first target face image to the second target face image, the second target face image and the first target face image belonging to a same target.

An image processing apparatus is provided, the apparatus including a memory and a processor. The processor is configured to: obtain a first target face image in a reference expression state; obtain user face key point offset information that includes offsets between face key points of a user in a target expression state and face key points of the user in the reference expression state; adjust face key points of the first target face image in the reference expression state according to the user face key point offset information; and attach, in a to-be-processed image including a second target face image, an expression texture image of the adjusted first target face image to the second target face image, the second target face image and the first target face image belonging to a same target.

A non-transitory computer-readable storage medium is provided, storing a computer program, the computer program, when executed by a processor, causing the processor to perform: obtaining a first target face image in a reference expression state; obtaining user face key point offset information that includes offsets between face key points of a user in a target expression state and face key points of the user in the reference expression state; adjusting face key points of the first target face image in the reference expression state according to the user face key point offset information; and attaching, in a to-be-processed image including a second target face image, an expression texture image of the adjusted first target face image to the second target face image, the second target face image and the first target face image belonging to a same target.

DESCRIPTION OF EMBODIMENTS

To make the objectives, technical solutions, and advantages of the present disclosure clearer and more understandable, the present disclosure is further described in detail below with reference to the accompanying drawings and the embodiments. It is to be understood that the specific embodiments described herein are merely used for explaining the present disclosure, but are not intended to limit the present disclosure.

"First" and "second" in the embodiments of the present disclosure are merely used for distinction, and are not intended to constitute a limitation in aspects of a size, an order, subordination, or the like.

With the development of the field of computers, there are more manners for image processing, and functions of image processing become stronger. For example, a user may perform an operation, such as modification, on expressions of people in some photographs or videos. Optionally, the user may perform an operation, such as modification, on an expression of a person in an image or a video through an application stored in a computer device. Optionally, the application may be an application having an image editing function such as image viewing, video playing, and image playing. In the computer device installed with the application, the user may open an image or a video in the application, to implement an operation such as modifying an expression of a person in the photograph or the video. Optionally, an image processing method provided by an embodiment of the present disclosure may be applied to the application.

Figure 1:
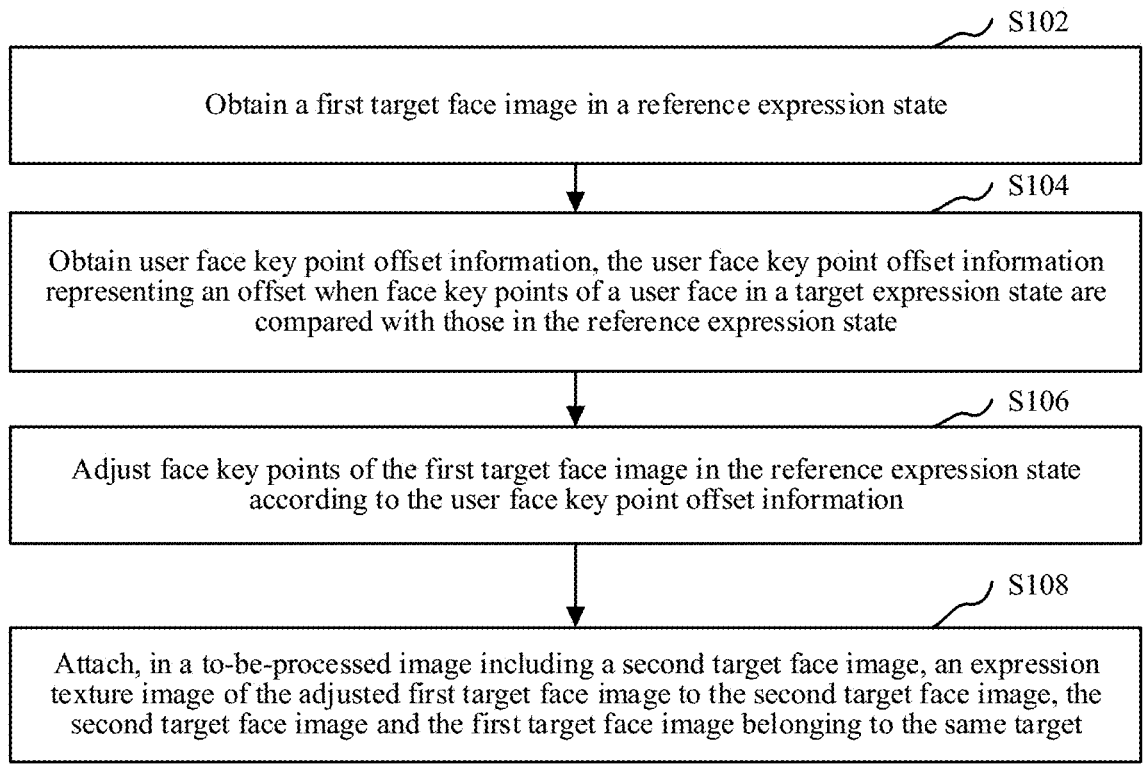
FIG. 1 is a schematic flowchart of an image processing method according to an embodiment of the present disclosure.

FIG. 1 is a schematic flowchart of an image processing method according to an embodiment of the present disclosure. In some embodiments, an example in which the image processing method is applied to a computer device is mainly used for description. The computer device may be a terminal or a server. Referring to FIG. 1, the method specifically includes the following steps:

S102: Obtain a first target face image in a reference expression state.

The reference expression state may be a state presenting a reference expression. The reference expression is an expression that is used as an adjustment basis before the adjustment. It may be understood that, the computer device performs expression adjustment based on the reference expression.

The face image is an image reflecting facial information. The target face image is a face image reflecting target facial information. The target face is a face, on which expression adjustment needs to be performed, in an image or a video. That is, an expression of the target face needs to be adjusted. The first target face image is any one of a plurality of target face images.

In an embodiment, the facial information includes a facial contour and a face key point. The face key point is a dotted form of expression of a facial organ in the facial contour. That is, the facial organ in the facial contour is represented in a form of dots. It may be understood that, the face key point may be used for representing a location of the facial organ in the facial contour. For example, the face key point is used for representing locations of facial organs such as the eyebrows, the eyes, the nose, and the mouth.

In an embodiment, the facial contour may be a contour of a complete face from the forehead to the chin. However, the forehead has no effect on reflecting an expression of a person, that is, when an expression of a person changes, the forehead usually does not change. For example, in an expression of smile and an expression of no smile, the forehead basically does not change. In some cases, even though the forehead changes, the change is not aesthetic enough (such as forehead wrinkles). Therefore, in another embodiment, the facial contour may alternatively be a remaining contour after a forehead contour is removed from a contour of a complete face.

Figure 2:
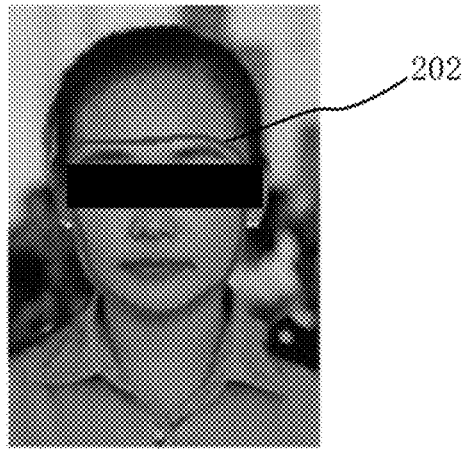
FIG. 2 is a schematic diagram of a face image according to an embodiment of the present disclosure.

FIG. 2 is a schematic diagram of a face image according to an embodiment of the present disclosure. Referring to FIG. 2, a circle corresponding to 202 is a facial contour (it can be seen that the facial contour does not include a forehead contour). Locations of facial organs, such as the eyebrows, the eyes, the nose, and the mouth, in the facial contour 202 may be represented by using face key points.

In an embodiment, the obtaining a first target face image in a reference expression state includes: extracting the first target face image from an image including the first target face image in the reference expression state.

For example, for a photograph including a face without a smile (that is, aside from a face image, there is another environment or background image, such as a tree or a flower, in the photograph), the photograph is equivalent to an image including the first target face image in the reference expression state, the face in the photograph is the first target face image in the reference expression state, and the expression without a smile is the reference expression. Expression adjustment is subsequently performed based on the reference expression.

In another embodiment, the first target face image may be a pre-stored independent face image reflecting the target facial information. The computer device may directly obtain the pre-stored independent first target face image. It may be understood that, the pre-stored independent first target face image may be independently stored after being pre-extracted from the image including the first target face image.

S104: Obtain user face key point offset information, the user face key point offset information representing an offset when face key points of a user face in a target expression state are compared with those in the reference expression state. In other words, the user face key point offset information includes offsets between face key points of a user in a target expression state and face key points of the user in the reference expression state The target expression state is a state in which a presented expression is a target expression. The target expression is an expression to which the reference expression needs to be adjusted. It may be understood that, the computer device performs expression adjustment based on the reference expression, and adjusts the expression to the target expression.

The user face is a face of a user of whom the expression of the target face is adjusted through the computer device. It may be understood that, the computer device may adjust, according to a target expression presented in the user face, the reference expression in the target face to the target expression. For example, when the reference expression of the target face is an expression without a smile, the user may emote a laughing expression, and the laughing expression is the target expression. The user may adjust, through the computer device, the expression of the target face from the expression without a smile to the laughing expression emoted by the user.

The user face key point offset information represents an offset when face key points of the user face in the target expression state compared with those in the reference expression state. It may be understood that, in different expression states, locations of the face key points vary. Therefore, the user face key point offset information represents an offset between locations of the face key points of the user face in the target expression state and locations of the face key points in the reference expression state.

Figure 3:
FIG. 3 is a schematic diagram of user face key point offset information according to an embodiment of the present disclosure.

To understand the user face key point offset information more directly, an example is used for description. FIG. 3 is a schematic diagram of user face key point offset information according to an embodiment of the present disclosure. In FIG. 3, a series of points are all key points. It may be understood that, the key points are points capable of reflecting a feature. Key points 1 to 17 are contour key points of a facial contour, and key points 18 to 68 are face key points in the facial contour. The user face key point offset information may include that a key point 38 and a key point 39 of an upper eyelid is offset upwards by 10%, and a key point 41 and a key point 42 of a lower eyelid is offset downwards by 10% (that is, an expression of widely opening eyes is emoted). It may be understood that, the user face key point offset information may include offsets of face key points of one or more facial organs in the target expression state compared with those in the reference expression state.

In an embodiment, the computer device may directly obtain preset user face key point offset information. Specifically, there may be one or more pieces of preset user face key point offset information. When there are a plurality of pieces of preset user face key point offset information, the user may select one piece of user face key point offset information therefrom, and the computer device may obtain the selected user face key point offset information.

In another embodiment, the obtaining user face key point offset information includes: determining a first expression template used for representing that the user face is in the reference expression state; obtaining a second expression template used for representing that the user face is in the target expression state; and obtaining the user face key point offset information according to location offset information between face key points corresponding to the first expression template and face key points corresponding to the second expression template.

The expression template is a preset template used for representing an expression.

Specifically, a plurality of expression templates may be preset in the computer device. The computer device may determine, from the preset expression templates, the first expression template used for representing that the user face is in the reference expression state.

In an embodiment, the user may select an expression template in the reference expression state from the set expression templates (that is, selecting an expression template representing the reference expression). The computer device may obtain the selected expression template as the first expression template used for representing that the user face is in the reference expression state. It may be understood that, the reference expression state herein is the reference expression state of the first target face image. The reference expression herein is an expression presented by the reference expression state of the first target face image.

In another embodiment, the computer device may alternatively match the set expression templates with the reference expression state of the first target face image, and use a matched expression template as the first expression template used for representing that the user face is in the reference expression state. It may be understood that, an expression presented by the matched expression template is the target expression.

In an embodiment, the computer device may obtain the second expression template selected through a selection operation of the user. The second expression template is used for representing that the user face is in the target expression state. It may be understood that, in another embodiment, the computer device may alternatively obtain, from the preset expression templates, an expression template that is configured to correspond to the first expression template, and use the obtained expression template as the second expression template used for representing that the user face is in the target expression state. For example, to correspond to the expression template without a smile, an expression template with a smile and/or a cry is configured.

It may be understood that, each expression template has corresponding face key points. The computer device may obtain the face key points corresponding to the first expression template and the face key points corresponding to the second expression template, and determine the location offset information between the face key points corresponding to the first expression template and the face key points corresponding to the second expression template, to obtain the user face key point offset information.

In the foregoing embodiment, the user face key point offset information is obtained by performing selection among the preset expression templates corresponding to the face key points, and no image acquisition resource needs to be invoked to acquire user face images in different expression states in real time, thereby reducing system resources consumed for image acquisition.

S106: Adjust face key points of the first target face image according to the user face key point offset information.

Specifically, the computer device may adjust locations of the face key points of the first target face image in the reference expression state according to the user face key point offset information. It may be understood that, when the adjusted locations of the face key points change, the expression in the first target face image may be changed.

S108: Attach, in a to-be-processed image including a second target face image, an expression texture image of the adjusted first target face image to the second target face image, the second target face image and the first target face image belonging to the same target.

It may be understood that, the second target face image in the to-be-processed image and the first target face image belonging to the same target indicates that both the second target face image and the first target face image are face images of the same target. For example, when the target is Tom, both the second target face image and the first target face image belong to face images of Tom.

The second target face image and the first target face image may be face images in different expressions belonging to the same target. In addition, the second target face image and the first target face image may alternatively be face images in the same expression belonging to the same target. That is, the second target face image and the first target face image may be completely the same. It may be understood that, when the second target face image and the first target face image are the same, the first target face image may be used for replacing the second target face image in the description of the second target face image.

In an embodiment, the obtaining a first target face image in a reference expression state may include: obtaining the first target face image in the reference expression state in the to-be-processed image. The attaching, in a to-be-processed image including a second target face image, an expression texture image of the adjusted first target face image to the second target face image includes: attaching, in the to-be-processed image, the expression texture image of the adjusted first target face image to the first target face image of the to-be-processed image.

The to-be-processed image is an image on which image processing is to be performed. The to-be-processed image includes the second target face image. There is at least one to-be-processed image. Only the image processing method applied to one to-be-processed image is described herein. Image processing methods applied to all the to-be-processed images are the same. The to-be-processed image may be an independent image, or may be an image frame in a video.

A texture is information reflecting details of an object surface, and includes at least one piece of information such as lines, a color, or a pattern of the object surface. An expression texture is information reflecting an expression in a face image. A texture image is an image including a texture, that is, an image including information reflecting details of an object surface. An expression texture image is an image including an expression texture. That is, the expression texture image includes information reflecting an expression in a face image.

In an embodiment, the expression texture image may be a texture image in a facial contour of the adjusted first target face image. It may be understood that, the texture image in the facial contour includes facial organs such as the eyes, the nose, the mouth, and the eyebrows. Locations of the facial organs can reflect the expression in the first target face image. Therefore, the texture image in the facial contour of the adjusted first target face image may be used as the expression texture image. Using FIG. 2 as an example for description, assuming that the face image in FIG. 2 is the adjusted first target face image, the circle 202 is the facial contour, and an image in the facial contour 202 may be used as the expression texture image.

In another embodiment, the expression texture image may alternatively be an image including only facial organs. It may be understood that, because an expression can also be reflected when only the facial organs are included, the expression texture image may include only the facial organs, and does not include other facial skins. For example, the expression texture image includes only the facial organs, and remaining facial skins are transparent or blank images.

The computer device may crop the expression texture image from the first target face image in which the face key point is adjusted according to the user face key point offset information, and attach the cropped expression texture image to the second target face image in the to-be-processed image.

It may be understood that, because the second target face image and the first target face image belong to the same target, when the expression texture image of the adjusted first target face image is attached to the second target face image in the to-be-processed image, facial features of the second target face image are not changed.

In an embodiment, the computer device may cut off a region, which corresponds to the expression texture image of the first target face image, in the second target face image of the to-be-processed image, and correspondingly attach the expression texture image of the adjusted first target face image to the cut region, to form a new image. In another embodiment, alternatively, the computer device may directly cover the corresponding region in the second target face image of the to-be-processed image by using the expression texture image of the adjusted first target face image.

For ease of understanding, examples are used for describing the two cases. For example, if a to-be-processed image is A, a second target face image in the to-be-processed image A is a, and a first target face image is b, when an expression texture image in b is attached to A, a region used for attaching may be first determined in the image A, and the region is cut off. Then the expression texture image in b is attached to and filled in the cut region, to obtain a new image. In addition, cropping may alternatively not be performed on the image A, and the expression texture image in b is directly used for covering the region used for attaching.

Figure 4:
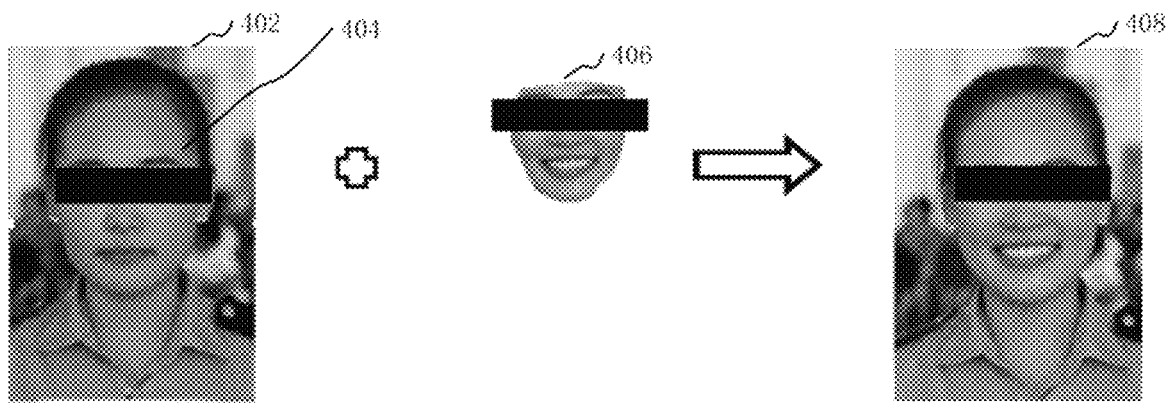
FIG. 4 is a schematic diagram of attaching an expression texture image according to an embodiment of the present disclosure.

FIG. 4 is a schematic diagram of attaching an expression texture image according to an embodiment of the present disclosure. In FIG. 4, a case in which the second target face image included in the to-be-processed image is the same as the first target face image is used for description. Referring to FIG. 4, a to-be-processed image 402 includes a first target face image 404 in a reference expression state. After face key points of the first target face image 404 are adjusted according to user face key point offset information, an expression texture image cropped from the adjusted first target face image is 406. The computer device may attach the expression texture image 406 to the to-be-processed image, to obtain an image 408 having a target expression.

In an embodiment, the method further includes: determining, from the to-be-processed image to which the expression texture image is attached, an edge region of the attached expression texture image and a junction image region; separately extracting first complexion data of skins in the edge region and second complexion data of skins in the junction image region; and performing complexion fusion processing according to the first complexion data and the second complexion data.

It may be understood that, after the expression texture image is attached to the to-be-processed image, there is an edge region of the attached expression texture image and a junction image region in the to-be-processed image. A complexion difference may exist between the junction image region and the edge region of the attached expression texture image. Therefore, the computer device may separately extract the first complexion data in the edge region and the second complexion data in the junction image region. The computer device may perform complexion fusion processing according to the first complexion data and the second complexion data, so that complexions between the edge region of the attached expression texture image and the junction image region are naturally transited, thereby improving the quality and the effect of image processing.

In an embodiment, the computer device may provide a manner for calculating an average value of the first complexion data and the second complexion data, to implement the complexion fusion processing.

Through the foregoing image processing method, user face key point offset information is obtained, the user face key point offset information representing an offset when face key points of a user face in a target expression state are compared with those in a reference expression state; and face key points of a first target face image in the reference expression state are adjusted according to the user face key point offset information. In this way, an expression in an expression texture image in the adjusted first target face image belongs to a target expression. In a to-be-processed image including a second target face image, the expression texture image of the adjusted first target face image is attached to the second target face image, the second target face image and the first target face image belonging to the same target. Because the expression texture image of the adjusted first target face image is attached to the second target face image of the to-be-processed image, in a case that original facial features of the second target face image are reserved, an expression of a target face in the to-be-processed image is changed through an expression of the user face.

In an embodiment, the obtaining user face key point offset information includes: obtaining a first face key point in a user face image in the reference expression state; recognizing a second face key point in another user face image in the target expression state; and determining location offset information between the first face key point and the second face key point, to obtain the user face key point offset information. For example, the first face key point and the second face key point are same types of points (e.g., both are key point #37 in the corresponding face key point set as shown in FIG. 3). In some embodiments, assuming each face image has N key points, the user face key point offset information may include offset information between N pairs of face key points. In some embodiments, since the expression state may just change location of certain face key points, the user face key point offset information may include location offset information of a subset of the N pairs of face key points.

As used herein, a user face image in the reference expression state may also be referred as a first user face image of a user; and a user face image in the target expression state may also be referred as a second face image of a user. In an exemplary embodiment, the first user face image and the second user face image are of the same user; and the user face key point offset information are obtained based on face images of the same user at different expression states. In some examples, the first target face image corresponds to the same user as the face images used to obtain the user face key point offset information. In some alternative examples, the first target face image is of a different user from the face images used to obtain the user face key point offset information.

The user face image in the reference expression state is a user face image reflecting the reference expression. The user face image is a face image reflecting user face information. The reference expression state of the user face image is consistent with the reference expression state of the first target face image. For example, when the reference expression state of the first target face image is a normal expression without a smile, the reference expression state of the user face image is also the normal expression without a smile.

In an embodiment, the computer device may obtain the user face image in the reference expression state, and extract the first face key point therefrom. The computer device may directly obtain an existing user face image in the reference expression state, or may acquire a user face image in the reference expression state. It may be understood that, the user may emote the reference expression to an image acquisition apparatus, and the image acquisition apparatus performs face image acquisition on the user emoting the reference expression, to acquire the user face image in the reference expression state. The computer device may recognize the first face key point from the acquired user face image in the reference expression state.

Alternatively, the computer device may directly obtain a pre-stored first face key point in a user face image in the reference expression state. It may be understood that, the pre-stored first face key point in the user face image in the reference expression state may be a first face key point stored after being extracted from the user face image in the reference expression state.

In an embodiment, the computer device may obtain the user face image in the target expression state, and recognize the second face key point from the user face image in the target expression state. Specifically, the computer device may obtain a pre-stored user face image in the target expression state. The computer device may alternatively invoke the image acquisition apparatus to acquire the user face image in the target expression state. That is, the user may emote the target expression to the image acquisition apparatus, and the image acquisition apparatus performs face image acquisition on the user emoting the target expression, to obtain the user face image in the target expression state.

The computer device may determine the location offset information between the first face key point and the second face key point, to obtain the user face key point offset information. It may be understood that, the location offset information between the first face key point and the second face key point may be an offset from a location of the first face key point to a corresponding location of the second face key point, or may be an offset from a location of the second face key point to a corresponding location of the first face key point.

It may be understood that, the computer device may obtain the offset according to a difference between the location of the first face key point and the location of the second face key point. The location of the first face key point and the location of the second face key point are both determined with reference to the same reference object.

In an embodiment, the computer device may use a center point or a center line of a facial organ corresponding to the first face key point and the second face key point as the reference object, to separately determine a location of the first face key point relative to the reference object and a location of the second face key point relative to the reference object. Further, the computer device may obtain the offset according to a difference between the location of the first face key point and the location of the second face key point.

It may be understood that, a location of a center point and a center line of a facial organ of the same person does not change with different expressions. For example, a center line of the eyes remains unchanged, and only open levels of the upper eyelid and the lower eyelid change with the expression. It is assumed that the center line of the eyes represents that the eye open degree is 0 degrees, a first face key point is an eye key point A, of which an open degree relative to the center line of the eyes is 5 degrees upwards, and a second face key point corresponding to the eye key point A is an eye key point A', of which an open degree relative to the center line of the eyes is 15 degrees upwards. In this case, an offset between the location of the eye key point A and the location of the eye key point A' may be 15 degrees upwards.

In another embodiment, the computer device may alternatively use the same vertex in the user face image in the target expression state and the user face image in the reference expression state as the reference object. The computer device may use the vertex as a coordinate origin, to build a two-dimensional plane rectangular coordinate system. For example, a vertex in the upper left corner of the user face image may be used as a coordinate origin to build a two-dimensional plane rectangular coordinate system. The computer device may determine location coordinates of the first face key point in the two-dimensional plane rectangular coordinate system, and location coordinates of the second face key point in the two-dimensional plane rectangular coordinate system. The computer device may obtain the offset according to a difference between the location coordinates of the first face key point and the location coordinates of the second face key point.

It may be understood that, a first face key point and a second face key point representing the same region of a facial organ correspond to each other. Using FIG. 3 as an example, in the user face image in the reference expression state shown in FIG. 3, a key point 38 and a key point 39 represent the upper eyelid of the right eye. The key point 39 is closer to a key point of the nose than the key point 38. In this case, the key point 39 corresponds to a key point, which is closer to the nose, of two key points, which represent the upper eyelid of the right eye, in the user face image in the target expression state.

Figure 5:
FIG. 5 is a schematic diagram of adjusting face key points of a first target face image according to an embodiment of the present disclosure.

FIG. 5 is a schematic diagram of adjusting face key points of a first target face image according to an embodiment of the present disclosure. In FIG. 5, a case in which the second target face image included in the to-be-processed image is the same as the first target face image is used for description. Referring to FIG. 5, 502 is a to-be-processed image, 502a is a first target face image in a reference expression state in the to-be-processed image, and 504a is a user face image in the reference expression state. It can be seen from FIG. 5 that, both 502a and 504a are normal relaxed expressions without a smile. 504b is a user face image in a target expression state. User face key point offset information is obtained according to location offset information between a first face key point in 504a and a second face key point in 504b. The computer device may adjust the face key points in 502a according to the obtained user face key point offset information, and attach an expression texture image 502b in the adjusted first target face image to the first target face image 502a in the to-be-processed image 502, to obtain a new image 506.

In the foregoing embodiment, user face key point offset information is obtained by obtaining a first face key point in a user face image in a reference expression state, recognizing a second face key point in a user face image in a target expression state, and obtaining location offset information between the first face key point and the second face key point. A facial expression in a to-be-processed image can be flexibly adjusted according to a user face, so that the flexibility of image processing is improved. In addition, the facial expression in the to-be-processed image is directly adjusted according to the user face, which prevents complex processing, thereby improving the efficiency of image processing.

In an embodiment, the to-be-processed image is an image frame in a video; and the obtaining a first target face image in a reference expression state includes: extracting the first target face image in the reference expression state from a reference image frame of the video. The recognizing a second face key point in a user face image in the target expression state includes: playing the video, and acquiring user face images in the corresponding target expression states for image frames of the video; and recognizing the second face key point in the acquired user face images in the target expression state.

It may be understood that, at least one image frame in the image frames of the video may be the to-be-processed image. When a plurality of image frames are all to-be-processed images, the image processing method provided in the embodiments of the present disclosure may be used for each to-be-processed image.

The reference image frame is an image frame, which includes the first target face image in the reference expression state, in the video. The reference image frame may be a default fixed image frame selected from the video. That is, different to-be-processed images in the video all correspond to one reference image frame. In an embodiment, the reference expression state may be a normal expression state. The normal expression state is an expression state without pleasure, anger, sorrow, or joy. In another embodiment, the reference expression state may be an expression state of the reference image frame. That is, the expression state of the reference image frame is considered as the reference expression state, and the reference expression state is not limited to any expression state.

The reference image frame may alternatively be a to-be-processed image in the video. That is, the reference image frame may dynamically change. When the to-be-processed image in the video changes, because the reference image frame is the to-be-processed image, the reference image frame also changes. In this case, the reference expression state is an expression state of the to-be-processed image when the to-be-processed image is not adjusted.

In an embodiment, the reference image frame may be selected from the image frames of the video when the video is in a played state. Specifically, when playing the video, a user may input an image frame specifying instruction to the video. The computer device may select a specified reference image frame from the image frames of the video in response to the image frame specifying instruction. That is, the reference image frame may be selected from the image frames of the video in response to the image frame specifying instruction that is received during playing of the video.

In an embodiment, the computer device generates prompt information when the video is in a played state, to prompt the user to select the reference image frame. The computer device may receive and respond to the image frame specifying instruction that is inputted by the user for the prompt information, and select the specified reference image frame from the image frames of the video.

In another embodiment, the reference image frame may alternatively be selected from the image frames of the video in an image frame selection interface. The user may trigger and enter the image frame selection interface. The interface may present the image frames of the video. The user may specify the reference image frame therefrom, and the computer device may select the reference image frame specified by the user. The image frame selection interface is an interface specially used for selecting the reference image frame in the video.

The computer device may extract the first target face image in the reference expression state from the reference image frame of the video, and perform the step of obtaining a first face key point in a user face image in the reference expression state. In some embodiments of the present disclosure, the recognizing a second face key point in a user face image in the target expression state includes: playing the video, and acquiring user face images in the corresponding target expression state for image frames of the video; and recognizing the second face key point in the acquired user face images in the target expression state.

Specifically, the computer device may play the video. The user may emote corresponding target expressions for the image frames of the video in a procedure of playing the video. The computer device may acquire a user face image in the target expression state corresponding to the image frame. It may be understood that, the user face image in the target expression state corresponding to the image frame of the video presents the target expression corresponding to the image frame. The computer device acquires corresponding user face images in the target expression states for the image frames. The target expression states of the user face images corresponding to different image frames may be the same or different. For example, a target expression presented by a target expression state of a user face image corresponding to an image frame A is a smile. A target expression presented by a target expression state of a user face image corresponding to a next image frame B may be no smile.

The computer device may recognize the second face key point from the acquired user face images in the target expression states, perform the step of determining the location offset information between the first face key point and the second face key point to obtain the user face key point offset information, and perform subsequent steps S106 to S108. It may be understood that, because the to-be-processed image is the image frame in the video, in some embodiments, the to-be-processed image in step S108 may be replaced by the image frame of the video for description. That is, in the image frame of the video including the second target face image, the expression texture image of the adjusted first target face image is attached to the second target face image, the second target face image and the first target face image belonging to the same target.

It may be understood that, the to-be-processed image to which the expression texture image is attached is a new target image in which an expression has changed. In this way, the played video picture is directly displayed as the new target image that is generated after the expression texture image is attached.

In the foregoing embodiment, during playing of a video, a facial expression in an image frame of the video may be directly adjusted according to a user face, which avoids complex processing, thereby improving the efficiency of performing image processing for a video. In addition, an expression of the user face is relatively flexible, so that the flexibility of performing image processing for a video is also improved. Then, an expression of a face of another person in the video may be adjusted through the user face, so that it is more convenient and more diverse to perform image processing on the video.

In an embodiment, an image processing method is provided. The image processing method is applied to a computer device, and specifically includes the following steps:

(1) Generate, in a procedure of playing a video, prompt information used for selecting a reference image frame.

(2) Receive an image frame specifying instruction that is inputted based on the prompt information.

It may be understood that, a user may select the reference image frame from the video based on the prompt information, to input the image frame specifying instruction.

(3) Select the reference image frame from image frames of the video in response to the image frame specifying instruction. The selected reference image frame includes a first target face image in a reference expression state.

(4) Extract a first target face image in a reference expression state from the reference image frame of the video.

(5) Detect face key points of the first target face image in the reference image frame, and stores a facial contour of the first target face image in the reference image frame, and locations of the face key points.

(6) Acquire a user face image in the reference expression state by using an image acquisition device, and recognize a first face key point from the acquired user face image in the reference expression state.

(7) Re-play the video, and prompt the user to emote an expression; and acquire user face images in corresponding target expression states for the image frames of the video.

It may be understood that, in the procedure of playing the video, when the user emotes an expression, the computer device may acquire the expression emoted by the user. In this case, during playing of each image frame, an expression emoted by the user is a target expression for the image frame. In this way, for the image frames of the video, the corresponding user face images in the target expression states are acquired. The target expression states of the user face images corresponding to different image frames may be the same or different.

(8) Separately recognize second face key points in the user face images in the target expression states.

(9) Separately determine location offset information between the second face key points and the first face key point, to obtain user face key point offset information corresponding to the user face images in the target expression states, each piece of the user face key point offset information corresponding to an image frame targeted by the corresponding user face image in the target expression state.

It may be understood that, the user face key point offset information determined according to the second face key point corresponds to the user face image, from which the second face key point is extracted, in the target expression state.

(10) Separately adjust the locations of the face key points of the first target face image in the reference expression state according to the user face key point offset information; and crop expression texture images in the facial contour from the adjusted first target face images.

It may be understood that, when the face key points of the first target face image in the reference expression state are adjusted according to different pieces of user face key point offset information, different adjusted first target face images may be obtained.

(11) Attach, in each image frame, which includes the second target face image, in the video, the corresponding expression texture image to the second target face image of the image frame, to obtain each new image frame, the second target face image and the first target face image belonging to the same target.

Generally, the second target face image and the first target face image belong to a face of the same target.

It may be understood that, each image frame, which includes the second target face image, in the video is equivalent to being replaced by a new image frame. In this way, a new video may be obtained.

Figure 6:
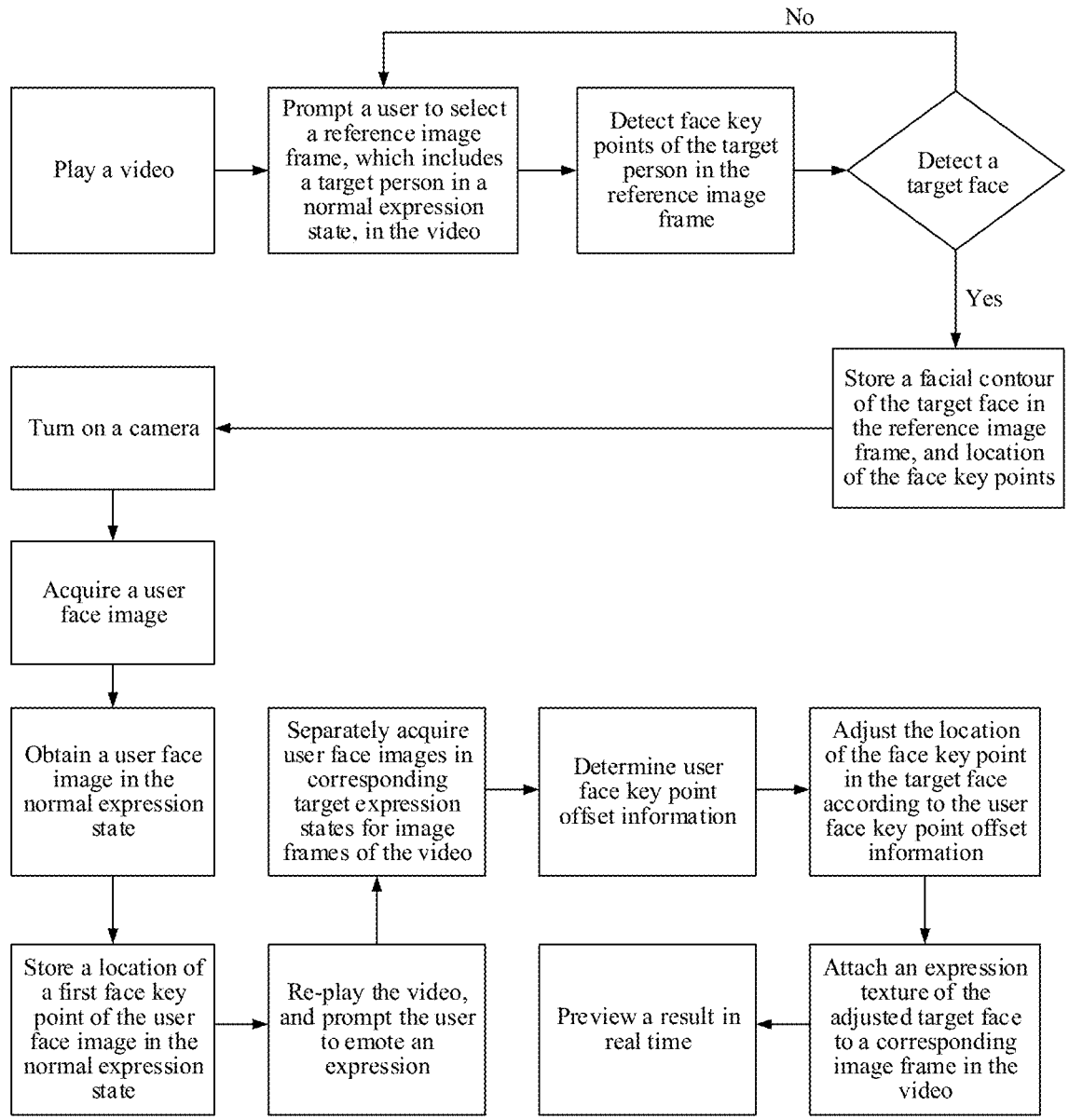
FIG. 6 is a schematic principle diagram of an image processing method according to an embodiment of the present disclosure.

FIG. 6 is a schematic principle diagram of an image processing method according to an embodiment of the present disclosure. Referring to FIG. 6, a user may select a video to play. In a procedure of playing the video, a computer device may prompt the user to select a reference image frame, which includes a target person in a normal expression state, in the video. That is, the reference image frame includes a first target face image in the normal expression state (that is, in a reference expression state). The computer device may detect face key points of the target person in the reference image frame (that is, detecting face key points in the first target face image in the reference image frame). If a target face (that is, the first target face image) in the reference image frame is detected, a facial contour of the target face in the reference image frame and locations of the face key points are stored. The computer device turns on a camera, acquires user face images (e.g., the user face images may be of a user different from the target person), obtains a first user face image in the normal expression state (that is, obtaining a user face image in the reference expression state), and stores a location of a first face key point of the first user face image in the normal expression state. The computer device may re-play the video, and prompt the user to emote an expression. The expression emoted by the user is a target expression. The computer device may separately acquire/collect, through the camera, user face images in corresponding target expression states for image frames of the video (e.g., for being used to adjust the target face in the image frames of the video, here, the image frame of the video containing the target face may be considered as the to-be-processed image including the second target face image), and determine user face key point offset information according to location offset information between the first face key point in the first user face image in the normal expression state and a second face key point in a second user face image in the target expression state. The computer device may adjust the locations of the face key points in the target face (that is, the first target face image) according to the user face key point offset information, and attach an expression texture of the adjusted target face (that is, the expression texture image of the adjusted first target face image) to the corresponding image frame in the video. The user may preview a result in real time. For example, for an image frame containing the target face at a first timestamp in the video, the user may emote a first desired target expression which is captured by the camera on the second user face image; the computer device may determine user face key point offset information based on the first user image at the reference expression state and the second user image at the first desired target expression state, and adjust key points in the target face accordingly to obtain an expression texture of the target face; and the image frame containing the target face at the first timestamp may be adjusted based on the expression texture. Similarly, for an image frame containing the target face at a second time stamp, the user may emote a second desired target expression, and the image frame at the second timestamp may be adjusted in a similar process to present the target face in the second desired target expression state.

In an embodiment, the method further includes: performing, in a case that the first target face image does not match the user face image in the target expression state, the step of obtaining user face key point offset information; and mapping, in the to-be-processed image including the second target face image, an expression feature in the user face image in the target expression state to the second target face image in a case that the first target face image matches the user face image in the target expression state, the second target face image and the first target face image belonging to the same target.

It may be understood that, when the first target face image does not match the user face image in the target expression state, it indicates that the target to which the first target face image belongs is different from the user to which the user face image in the target expression state belongs. That is, the first target face image and the user face image in the target expression state represent faces of different persons. Otherwise, when the first target face image matches the user face image in the target expression state, it indicates that the target to which the first target face image belongs is the same as the user to which the user face image in the target expression state belongs. That is, the first target face image and the user face image in the target expression state represent a face of the same person.

Specifically, when the first target face image matches the user face image in the target expression state, it indicates that the first target face image and the user face image in the target expression state represent faces of the same person in different expression states. In this case, basic facial features of the first target face image and the user face image are the same. The second target face image and the first target face image belong to the same target, that is, belong to the face of the same person. Therefore, in the to-be-processed image including the second target face image, the expression feature in the user face image in the target expression state may be directly mapped to the second target face image without performing adjustment on the locations of the face key points.

It may be understood that, after the expression feature in the user face image in the target expression state is mapped to the second target face image in the to-be-processed image, an expression of the second target face image in the to-be-processed image is the target expression.

The second target face image in the to-be-processed image and the first target face image may be face images of different expressions belonging to the same target. In addition, the second target face image and the first target face image may alternatively be face images of the same expression belonging to the same target. That is, the second target face image and the first target face image may be completely the same.

It may be understood that, when the second target face image and the first target face image are the same, the first target face image may be used for replacing the second target face image in the description of the second target face image. For example, the mapping, in the to-be-processed image including the second target face image, an expression feature in the user face image in the target expression state to the second target face image may be replaced by mapping, in the to-be-processed image including the first target face image, an expression feature in the user face image in the target expression state to the first target face image.

In the foregoing embodiment, when the first target face image matches the user face image in the target expression state, in the to-be-processed image including the second target face image, the expression feature in the user face image in the target expression state is mapped to the second target face image, thereby improving the efficiency of image processing.

In an embodiment, the mapping, in the to-be-processed image including the second target face image, an expression feature in the user face image in the target expression state to the second target face image includes: determining a facial contour in the user face image in the target expression state; cropping a texture image in the facial contour from the user face image in the target expression state; and attaching, in the to-be-processed image including the second target face image, the texture image to a facial contour in the second target face image.

Specifically, the computer device may detect a facial contour in the user face image in the target expression state, and crop a texture image in the facial contour from the user face image. It may be understood that, the texture image in the facial contour can reflect the target expression in the user face image. Therefore, the computer device attaches, in the to-be-processed image including the second target face image, the cropped texture image to the facial contour in the second target face image. In this way, in the to-be-processed image to which the texture image is attached, an expression of a face image to which the texture image is attached is the target expression.

Descriptions may also be provided by using an example with reference to FIG. 4. Referring to FIG. 4, the first target face image and the user face image in the target expression state represent faces of the same person in different expression states. The to-be-processed image 402 includes the first target face image 404 in the reference expression state. The expression texture image 406 in the facial contour is directly cropped from the user face image in the target expression state. The computer device may attach the expression texture image 406 to the to-be-processed image, to obtain the image 408 having a target expression.

In an embodiment, the attaching, in the to-be-processed image including the second target face image, the cropped texture image to a facial contour in the second target face image includes: detecting a first contour key point of the facial contour; recognizing a second contour key point in the second target face image in the to-be-processed image; and matching the second contour key point with the first contour key point, to attach the cropped texture image to the facial contour in the second target face image.

The contour key points are a dotted presentation of the facial contour. That is, the facial contour is presented in a form of dots. For example, key points 1 to 17 in FIG. 3 are contour key points of the facial contour.

Specifically, the computer device may detect a first contour key point of the facial contour. The facial contour is the facial contour in the user face image in the target expression state. The computer device may recognize a second contour key point in the second target face image in the to-be-processed image. It may be understood that, the first target face image matches the user face image in the target expression state, that is, the first target face image and the user face image in the target expression state represent a face of the same person, and the second target face image and the first target face image belong to the same target. Therefore, a location of the second contour key point in the second target face image and a location of the first contour key point of the user face image are the same. Therefore, the second contour key point and the first contour key point may be matched, to implement positioning, so as to attach the cropped texture image to the facial contour in the second target face image of the to-be-processed image, so that the cropped texture image can be accurately attached to the facial contour in the second target face image, thereby improving the accuracy of image processing.

In an embodiment, the to-be-processed image is an image frame in a video. When the first target face image matches the user face image in the target expression state, the method further includes: playing the video, and acquiring user face images in the corresponding target expression states for image frames of the video; and the mapping, in the to-be-processed image including the second target face image, an expression feature in the user face image in the target expression state to the second target face image includes: mapping, in the to-be-processed image, which includes the second target face image, in the video, an expression feature in the user face image in the corresponding target expression state to the second target face image, to change the image frame of the video, to obtain a corresponding target image, to directly display the target images in the procedure of playing the video. It may be understood that, the target images corresponding to the image frames of the video are new image frames of the video.

In the foregoing embodiment, during playing of a video, a facial expression in an image frame of the video may be directly adjusted according to a user face, which avoids complex processing, thereby improving the efficiency of performing image processing for a video. In addition, an expression of the user face is relatively flexible, so that the flexibility of image processing is also improved.

In an embodiment, the to-be-processed image may alternatively be an independent image. In this case, after the expression feature in the user face image in the target expression state is mapped to the second target face image of the to-be-processed image, an image of a new target expression can be obtained.

In an embodiment, the method further includes: determining an edge region of the attached texture image and a junction image region from the to-be-processed image to which the texture image is attached; separately extracting complexion data of skins in the edge region and complexion data of skins in the junction image region; and performing complexion fusion processing according to the extracted complexion data.

Figure 7:
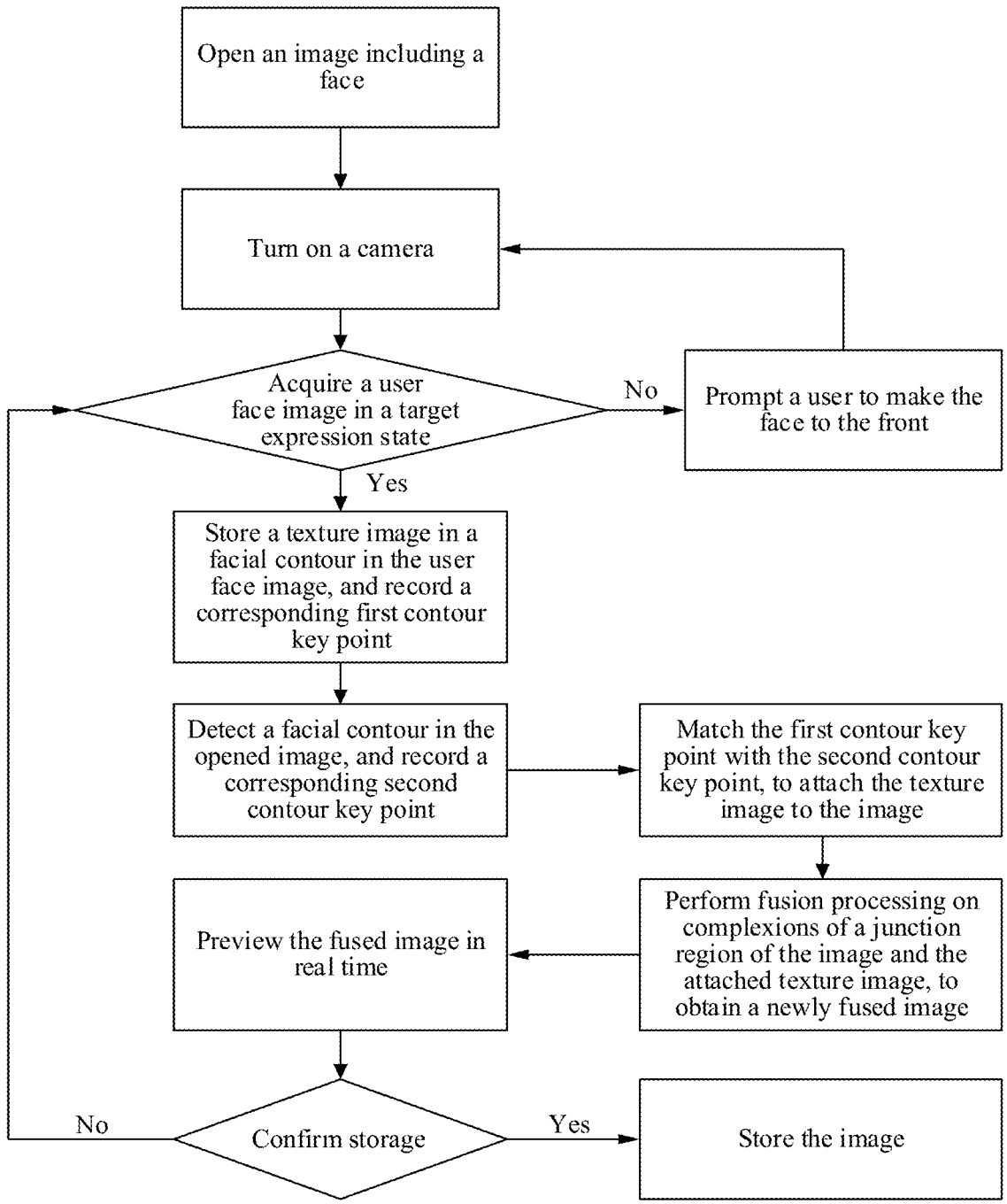
FIG. 7 is a schematic principle diagram of an image processing method according to another embodiment of the present disclosure.

FIG. 7 is a schematic principle diagram of an image processing method according to another embodiment of the present disclosure. FIG. 7 is a schematic principle diagram of an image processing method when the first target face image matches the user face image in the target expression state. In FIG. 7, descriptions are made for a case that the second target face image and the first target face image are completely the same. Therefore, the second target face image is replaced by the first target face image for description. Referring to FIG. 7, a user may open an image including a face (that is, a to-be-processed image including a first target face image) from an image gallery through a computer device. The computer device may turn on a camera to acquire a user face image in a target expression state, store a texture image in a facial contour in the user face image, and record a corresponding first contour key point. The computer device may detect a facial contour in the opened image, and record a corresponding second contour key point. The computer device may match the first contour key point with the second contour key point, to attach the texture image to the image. The computer device may perform fusion processing on complexions of a junction region of the image and the attached texture image, to obtain a newly fused image. The computer device may preview the fused image in real time, and store the image after storage is confirmed.

Figure 8:
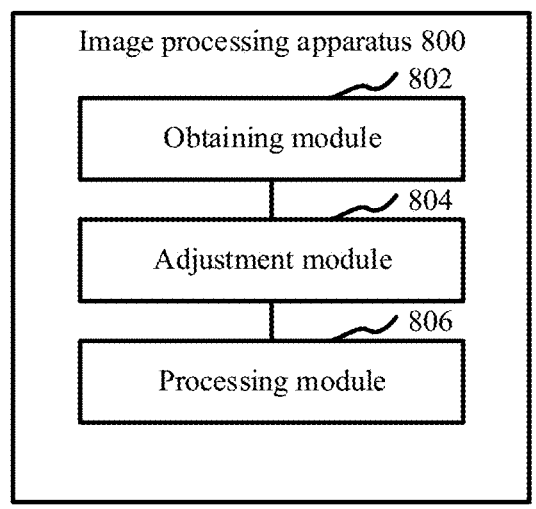
FIG. 8 is a block diagram of an image processing apparatus according to an embodiment of the present disclosure.

FIG. 8 is a block diagram of an image processing apparatus according to an embodiment of the present disclosure. An image processing apparatus 800 may be used in a computer device. As shown in FIG. 8, the apparatus 800 includes an obtaining module 802, an adjustment module 804, and a processing module 806.

The obtaining module 802 is configured to obtain a first target face image in a reference expression state; and obtain user face key point offset information, the user face key point offset information representing an offset when face key points of a user face in a target expression state are compared with those in the reference expression state.

The adjustment module 804 is configured to adjust face key points of the first target face image according to the user face key point offset information.

The processing module 806 is configured to attach, in a to-be-processed image including a second target face image, an expression texture image of the adjusted first target face image to the second target face image, the second target face image and the first target face image belonging to the same target.

In an embodiment, the obtaining module 802 is further configured to obtain a first face key point in a user face image in the reference expression state; recognize a second face key point in another user face image (e.g. of the same user) in the target expression state; and determine location offset information between the first face key point and the second face key point, to obtain the user face key point offset information.

In an embodiment, the to-be-processed image is an image frame in a video; and the obtaining module 802 is further configured to extract the first target face image in the reference expression state from a reference image frame of the video; play the video, and acquire user face images in the target expression state for image frames of the video; and recognize the second face key point in the acquired user face images in the target expression state.

In an embodiment, the reference image frame is selected from the image frames of the video in response to the image frame specifying instruction that is received during playing of the video; and the obtaining module 802 is further configured to acquire the user face image in the reference expression state, and recognize the first face key point from the acquired user face image in the reference expression state.

In an embodiment, the obtaining module 802 is further configured to perform, in a case that the first target face image does not match the user face image in the target expression state, the operation of obtaining user face key point offset information; and instruct, in a case that the first target face image matches the user face image in the target expression state, the processing module 806 to map, in the to-be-processed image including the second target face image, an expression feature in the user face image in the target expression state to the second target face image, the second target face image and the first target face image belonging to the same target.

In an embodiment, the processing module 806 is further configured to determine a facial contour in the user face image in the target expression state; crop a texture image in the facial contour from the user face image in the target expression state; and attach, in the to-be-processed image including the second target face image, the texture image to a facial contour in the second target face image.

In an embodiment, the processing module 806 is further configured to detect a first contour key point of the facial contour; recognize a second contour key point in the second target face image in the to-be-processed image; and match the second contour key point with the first contour key point, to attach the texture image to the facial contour in the second target face image.

In an embodiment, the obtaining module 802 is further configured to determine a first expression template used for representing that the user face is in the reference expression state; obtain a second expression template used for representing that the user face is in the target expression state; and obtain the user face key point offset information according to location offset information between face key points corresponding to the first expression template and face key points corresponding to the second expression template.

In an embodiment, the processing module 806 is further configured to determine, from the to-be-processed image to which the expression texture image is attached, an edge region of the attached expression texture image and a junction image region; separately extract first complexion data of skins in the edge region and second complexion data of skins in the junction image region; and perform complexion fusion processing according to the first complexion data and the second complexion data.

Figure 9:
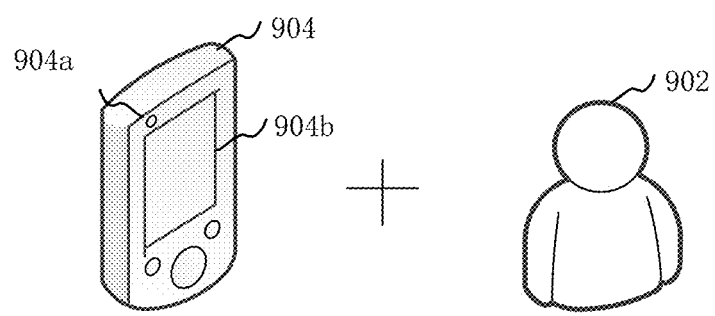
FIG. 9 is a diagram of an application environment of an image processing method according to an embodiment of the present disclosure.

FIG. 9 is a diagram of an application environment of an image processing method according to an embodiment of the present disclosure. The application environment includes a user 902 and a computer device 904. The computer device 904 may be a terminal or a server. The terminal may be an intelligent television, a desktop computer, or a mobile terminal, and the mobile terminal may include at least one of a mobile phone, a tablet computer, a notebook computer, a person digital assistant, and a wearable device. The server may be implemented by an independent server or a server cluster including a plurality of physical servers. An example in which the computer device 904 is a terminal is used for description in FIG. 9. When the computer device 904 is a terminal, the computer device 904 may include an image acquisition apparatus 904*a* and a display 904*b*.

The computer device 904 may obtain a first target face image in a reference expression state, and obtain user face key point offset information. For example, the computer device 904 may acquire a user face image of the user 902 in the reference expression state through the image acquisition apparatus 904*a*, extract face key points thereof, acquire a user face image of the user 902 in the target expression state, and extract face key points thereof. The computer device 904 may obtain user face key point offset information according to an offset when face key points of a user face in a target expression state are compared with those in the reference expression state. The computer device 904 may adjust the face key points of the first target face image in the reference expression state according to the user face key point offset information. The computer device 904 may display, through the display 904*b*, a to-be-processed image including a second target face image, and attach an expression texture image of the adjusted first target face image to the second target face image.

Figure 10:
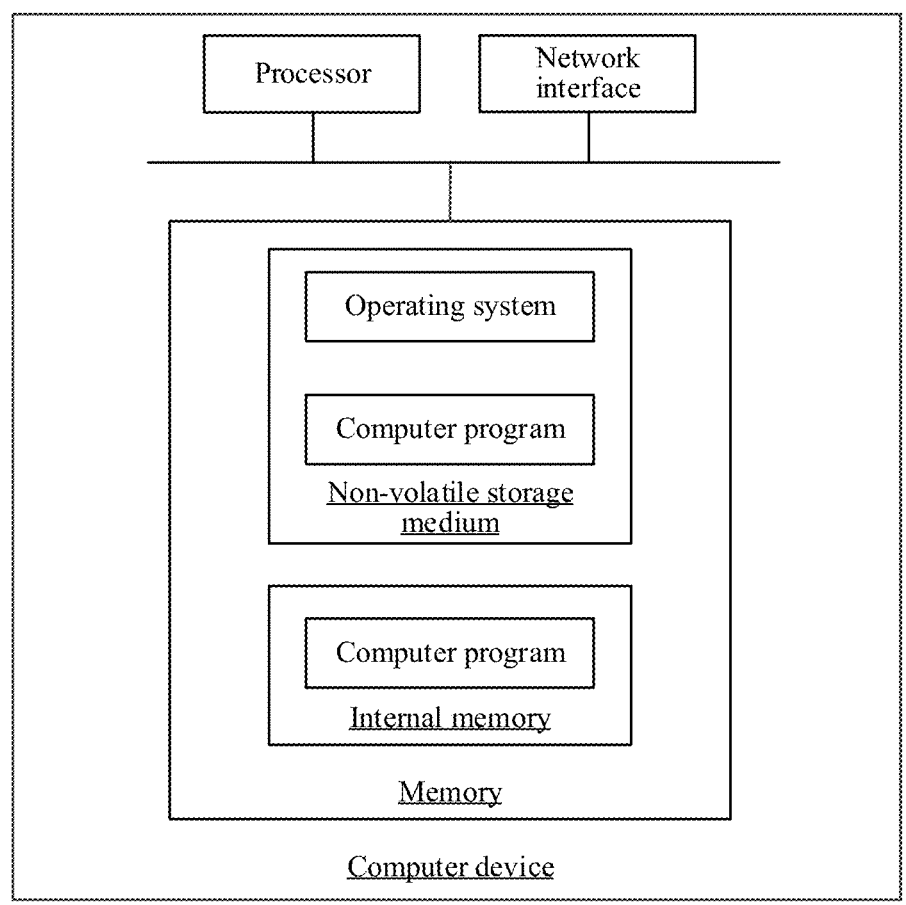
FIG. 10 is a schematic diagram of an inner structure of a computer device according to an embodiment of the present disclosure.

FIG. 10 is a schematic diagram of an inner structure of a computer device according to an embodiment of the present disclosure. Referring to FIG. 10, the computer device may be a terminal or a server. The computer device includes a processor, a memory, and a network interface connected through a system bus. The memory includes a non-volatile storage medium and an internal memory. The non-volatile storage medium of the computer device may store an operating system and a computer program. When the computer program is executed, the processor may be caused to perform an image processing method. The processor of the computer device is configured to provide calculation and control capabilities, to support running of the entire computer device. The internal memory may store a computer program, the computer program, when executed by the processor, causing the processor to perform an image processing method. The network interface of the computer device is configured to perform network communication.

A person skilled in the art is to understand that the structure shown in FIG. 10 is only a block diagram of a part of the structure related to the solution of the present disclosure, and does not constitute a limitation on the computer device to which the solution of the present disclosure is applied. The computer device may specifically include more or fewer components than components is shown in the figure, or combine some components, or have a different component arrangement.

In an embodiment, the image processing apparatus provided in the present disclosure may be implemented in a form of a computer program that may be executed on the computer device shown in FIG. 10. The non-volatile storage medium of the computer device may store program modules constituting the image processing apparatus, such as the obtaining module 802, the adjustment module 804, and the processing module 806 shown in FIG. 8. The computer program constituted by the program modules is configured to cause the computer device to perform the steps of the image processing method in the embodiments of the present disclosure, which are described in this specification. For example, the computer device may obtain a first target face image in a reference expression state; and obtain user face key point offset information through the obtaining module 802 in the image processing apparatus 800 shown in FIG. 8. The computer device may adjust face key points of the first target face image in the reference expression state according to the user face key point offset information through the adjustment module 804. The computer device may attach, in a to-be-processed image including a second target face image, an expression texture image of the adjusted first target face image to the second target face image through the processing module 806.

A computer device is provided, including a memory and a processor, the memory storing a computer program, and the computer program, when executed by the processor, implementing the image processing method of the computer device described in the foregoing embodiments.

A storage medium is provided, storing a computer program, the computer program, when executed by a processor, implementing the image processing method of the computer device described in the foregoing embodiments.

Through the foregoing image processing method and apparatus, computer device, and storage medium, user face key point offset information is obtained, the user face key point offset information representing an offset when face key points of a user face in a target expression state are compared with those in the reference expression state; and a face key point of a first target face image in the reference expression state is adjusted according to the user face key point offset information. In this way, an expression in an expression texture image in the adjusted first target face image belongs to a target expression. In a to-be-processed image including a second target face image, the expression texture image of the adjusted first target face image is attached to the second target face image, the second target face image and the first target face image belonging to the same target. Because the expression texture image of the adjusted first target face image is attached to the second target face image of the to-be-processed image, in a case that original facial features of the second target face image are reserved, an expression of a target face in the to-be-processed image is changed through an expression of the user face, thereby improving the accuracy of image processing.

It is to be understood that, steps in the various embodiments of the present disclosure are not necessarily performed in a sequence indicated by the step numbers. Unless explicitly specified in the present disclosure, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program runs, the procedures of the foregoing method embodiments are performed. Any reference to the memory, storage, a database, or other media used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM). Synchronous link (Synchlink) DRAM (SLDRAM), a rambus direct RAM (RDRAM), a direct rambus dynamic RAM (DRDRAM), and a rambus dynamic RAM (DRAM).

Various technical features in the foregoing embodiments may be combined randomly. For ease of description, possible combinations of various technical features in the foregoing embodiments are not all described. However, the combinations of the technical features is to be considered as falling within the scope recorded in this specification provided that the combinations of the technical features are compatible with each other.

The foregoing embodiments show only several implementations of the present disclosure, and descriptions thereof are in detail, but shall not be understood as limiting the patent scope of the present disclosure. A person of ordinary skill in the art may further make variations and improvements without departing from the ideas of the present disclosure, which all fall within the protection scope of the present disclosure. Therefore, the protection scope of the present disclosure is to be subject to the protection scope of the appended claims.

What is claimed is:

1. An image processing method, performed by a computer device, the method comprising:
    obtaining a first target face image in a reference expression state;
    obtaining user face key point offset information that includes offsets between face key points of a user in a target expression state and face key points of the user in the reference expression state;
    adjusting face key points of the first target face image according to the user face key point offset information; and
    attaching, in a to-be-processed image comprising a second target face image, an expression texture image of the adjusted first target face image to the second target face image, the second target face image and the first target face image belonging to a same target,
    wherein the user face key point offset information includes an offset between a first face key point in a first user face image in the reference expression state and a second face key point in a second user face image in the target expression state, and the offset is obtained by:
        using a center point or a center line of a facial organ corresponding to the first face key point and the second face key point as a reference object, and separately determining a location of the first face key point relative to the reference object and a location of the second face key point relative to the reference object; and
        determining the offset according to a difference between the location of the first face key point relative to the reference object and the location of the second face key point relative to the reference object.

2. The method according to claim 1, wherein the to-be-processed image is an image frame in a video; and the obtaining a first target face image in a reference expression state comprises:
    extracting the first target face image in the reference expression state from a reference image frame of the video; and
    the method further comprises: recognizing the second face key point in the second user face image of the user in the target expression state comprising:

playing the video, and acquiring the second user face image in the target expression state corresponding to an image frame of the video; and recognizing the second face key point in the acquired second user face image in the target expression state.

3. The method according to claim 2, wherein the reference image frame is selected from the image frames of the video in response to an image frame specifying instruction received during the playing of the video; and the first face key point is obtained from the selected reference image frame.

4. The method according to claim 1, further comprising:
performing, when the first target face image does not match the second user face image in the target expression state, the operation of obtaining user face key point offset information; and mapping, in the to-be-processed image comprising the second target face image, an expression feature in the second user face image in the target expression state to the second target face image when the first target face image matches the second user face image in the target expression state.

5. The method according to claim 4, wherein the mapping, in the to-be-processed image comprising the second target face image, an expression feature in the second user face image in the target expression state to the second target face image comprises:

determining a facial contour in the second user face image in the target expression state;

cropping a texture image in the facial contour from the second user face image in the target expression state; and attaching, in the to-be-processed image comprising the second target face image, the texture image to a facial contour in the second target face image.

6. The method according to claim 5, wherein the attaching, in the to-be-processed image comprising the second target face image, the texture image to a facial contour in the second target face image comprises:

detecting a first contour key point of the facial contour in the second user face image;

recognizing a second contour key point in the second target face image in the to-be-processed image; and matching the second contour key point with the first contour key point, to attach the texture image to the facial contour in the second target face image.

7. The method according to claim 1, wherein the obtaining user face key point offset information comprises:

determining a first expression template representing that the user is in the reference expression state;

obtaining a second expression template representing that the user is in the target expression state; and obtaining the user face key point offset information according to location offset information between face key points corresponding to the first expression template and face key points corresponding to the second expression template.

8. The method according to claim 1, further comprising:
determining, from the to-be-processed image to which the expression texture image is attached, an edge region of the attached expression texture image and a junction image region;

separately extracting first complexion data of skins in the edge region and second complexion data of skins in the junction image region; and performing complexion fusion processing according to the first complexion data and the second complexion data.

9. The method according to claim 1, wherein: the first user face image and the second user face image belong to the same target as the first target face image.

10. An image processing apparatus, comprising: a memory and a processor, the processor being configured to:
obtain a first target face image in a reference expression state; and obtain user face key point offset information that includes offsets between face key points of a user in a target expression state and face key points of the user in the reference expression state;

adjust face key points of the first target face image according to the user face key point offset information; and attach, in a to-be-processed image comprising a second target face image, an expression texture image of the adjusted first target face image to the second target face image, the second target face image and the first target face image belonging to a same target, wherein the user face key point offset information includes an offset between a first face key point in a first user face image in the reference expression state and a second face key point in a second user face image in the target expression state, and the offset is obtained by:

using a center point or a center line of a facial organ corresponding to the first face key point and the second face key point as a reference object, and separately determining a location of the first face key point relative to the reference object and a location of the second face key point relative to the reference object; and determining the offset according to a difference between the location of the first face key point relative to the reference object and the location of the second face key point relative to the reference object.

11. The apparatus according to claim 10, wherein the to-be-processed image is an image frame in a video; and the processor is further configured to extract the first target face image in the reference expression state from a reference image frame of the video; play the video, and acquire the second user face image in the target expression state corresponding to an image frame of the video; and recognize the second face key point in the acquired second user face image in the target expression state.

12. The apparatus according to claim 11, wherein the reference image frame is selected from the image frames of the video in response to an image frame specifying instruction received during the playing of the video; and the first face key point is obtained from the selected reference image frame.

13. The apparatus according to claim 11, wherein the processor is further configured to perform, when the first target face image does not match the second user face image in the target expression state, the operation of obtaining user face key point offset information; and map, when the first target face image matches the second user face image in the target expression state, in the to-be-processed image comprising the second target face image, an expression feature in the second user face image in the target expression state to the second target face image.

14. The apparatus according to claim 13, wherein the processor is further configured to:

determine a facial contour in the second user face image in the target expression state;

crop a texture image in the facial contour from the second user face image in the target expression state; and attach, in the to-be-processed image comprising the second target face image, the texture image to a facial contour in the second target face image.

15. The apparatus according to claim 14, wherein the processor is further configured to:

detect a first contour key point of the facial contour in the second user face image;

recognize a second contour key point in the second target face image in the to-be-processed image; and match the second contour key point with the first contour key point, to attach the texture image to the facial contour in the second target face image.

16. The apparatus according to claim 10, wherein the processor is further configured to:

determine a first expression template representing that the user is in the reference expression state;

obtain a second expression template representing that the user is in the target expression state; and obtain the user face key point offset information according to location offset information between face key points corresponding to the first expression template and face key points corresponding to the second expression template.

17. The apparatus according to claim 10, wherein the processor is further configured to:

determine, from the to-be-processed image to which the expression texture image is attached, an edge region of the attached expression texture image and a junction image region;

separately extract first complexion data of skins in the edge region and second complexion data of skins in the junction image region; and perform complexion fusion processing according to the first complexion data and the second complexion data.

18. A non-transitory computer-readable storage medium, storing a computer program, the computer program, when executed by a processor, causing the processor to perform:

obtaining a first target face image in a reference expression state;

obtaining user face key point offset information that includes offsets between face key points of a user in a target expression state and face key points of the user in the reference expression state;

adjusting face key points of the first target face image according to the user face key point offset information; and attaching, in a to-be-processed image comprising a second target face image, an expression texture image of the adjusted first target face image to the second target face image, the second target face image and the first target face image belonging to a same target, wherein the user face key point offset information includes an offset between a first face key point in a first user face image in the reference expression state and a second face key point in a second user face image in the target expression state, and the offset is obtained by:

using a center point or a center line of a facial organ corresponding to the first face key point and the second face key point as a reference object, and separately determining a location of the first face key point relative to the reference object and a location of the second face key point relative to the reference object; and determining the offset according to a difference between the location of the first face key point relative to the reference object and the location of the second face key point relative to the reference object.

* * * * *